Sept. 1, 1970   W. G. PAIGE ET AL   3,526,446
OPTICAL SYSTEM
Filed Aug. 31, 1967
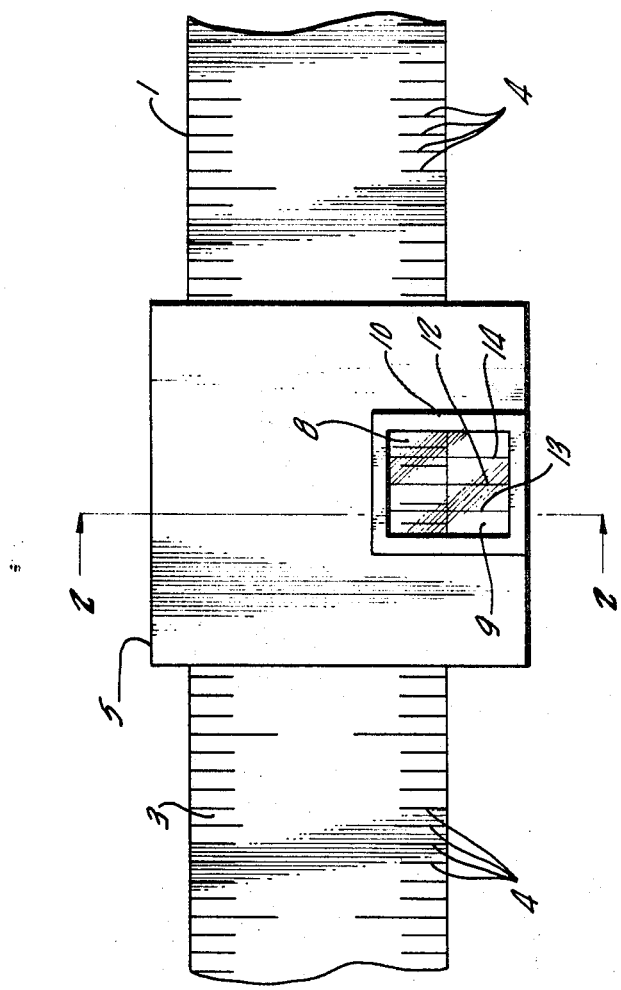
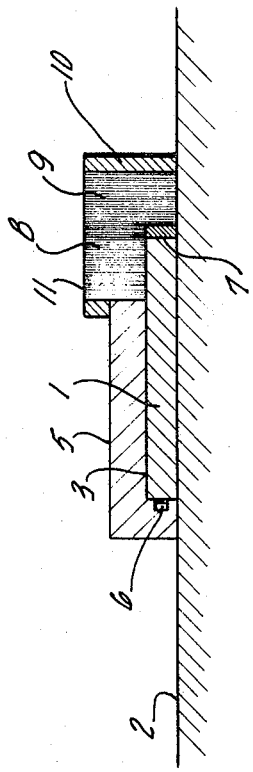
INVENTORS.
WALTER GRIFFIN PAIGE
SAMUEL J. SAKLEM
BY
Christie, Parker & Hale
ATTORNEYS United States Patent Office 3,526,446
Patented Sept. 1, 1970

3,526,446
OPTICAL SYSTEM
Walter Griffin Paige, Pasadena, and Samuel J. Saklem, Monrovia, Calif., assignors to Burroughs Corporation, Detroit, Mich., a corporation of Michigan
Filed Aug. 31, 1967, Ser. No. 664,827
Int. Cl. G02b 27/02, 5/14
U.S. Cl. 350—110         7 Claims

ABSTRACT OF THE DISCLOSURE

Parallax between lines on surfaces lying in different planes is eliminated by utilizing a mass of optical fibers to transmit light so the light from both surfaces effectively emanates from a common plane. In a slider for a ruler, two masses of optical fibers are employed. The ruler rests on the plane in which the lines to be measured lie. One mass extends from the top of the ruler to a plane above the ruler and the other mass extends from the bottom of the ruler to the same plane above the ruler. A hair line is etched in the end of the masses lying in the plane above the ruler.

BACKGROUND OF THE INVENTION

This invention relates to optical systems and, more particularly, to an arrangement for eliminating parallax between lines on surfaces lying in different planes.

Whenever parallel lines on surfaces lying in different planes are observed, they exhibit parallax. As an observer moves in a direction perpendicular to the lines and to the line of sight, the separation between the lines appears to change. This phenomenon is a source of error in visual measurement. For example, the graduations on the top surface of a ruler lie in a different plane from the lines to be measured by the ruler, which lie in the plane of the bottom surface of the ruler. The visual determination by an observer of the coincidence of a graduation on the top of the ruler with a line to be measured is thus adversely affected by parallax. Generally speaking, the longer the ruler is, the more pronounced are the effects of parallax because the ruler must be thicker to give it sufficient structural rigidity.

SUMMARY OF THE INVENTION

The invention utilizes a mass of optical fibers to transmit light from two surfaces such that the light effectively emanates from a common plane. This eliminates parallax between lines on the two surfaces.

The invention is particularly well suited for use in connection with a slider for a ruler. Two blocks of optical fibers transmit light from the surface on which the ruler rests and the top surface of the ruler, respectively, to a common plane lying above the ruler. One block extends from the top of the ruler to the common plane while the other block extends from the bottom of the ruler to the common plane. Lines on the resting surface can be measured by use of the graduations on the top surface of the ruler without parallax.

BRIEF DESCRIPTION OF THE DRAWING

The features of a specific embodiment of the invention are illustrated in the drawing, in which:

FIG. 1 is a top view of a slider for a ruler which incorporates the principles of the invention; and FIG. 2 is a side elevation view in cross-section of the slider of FIG. 1.

DESCRIPTION OF A SPECIFIC EMBODIMENT

Reference is made to the drawing in which a ruler 1 rests on a surface 2. On its top surface 3, ruler 1 has graduations 4 that are utilized to measure the position of lines on surface 2. A slider 5 is adapted to fit over ruler 1, surrounding surface 3 and the vertical sides of ruler 1. A spring 6 (FIG. 2), which is located in a slot inside of slider 5, presses slider 5 laterally (toward the left as seen in FIG. 2). Thus two hard wear-resistant pads on the opposite side of slider 5 from spring 6 bear firmly against the vertical side of ruler 1 so the movement of slider 5 is confined solely to translation parallel to the length of ruler 1. One of the pads, designated 7, is shown in FIG. 2. Blocks 8 and 9 of optical fibers are enclosed by a frame 10 and inlaid in slider 5 in abutting relationship. The optical fibers of blocks 8 and 9 transmit light in a direction perpendicular to surfaces 2 and 3. One end of the optical fibers of block 9 is contiguous to surface 2, and one end of the optical fibers of block 8 is contiguous to surface 3. The other end of the optical fibers of blocks 8 and 9 lie in a common plane, designated 11 in FIG. 2. As a result of this configuration of optical fibers, light from surface 3 is transmitted through block 8 and light from surface 2 is transmitted through block 9 to plane 11, where it in effect emanates as though originating there. Consequently, lines on surfaces 2 and 3 exhibit no parallax since they appear to lie in plane 11.

Hair lines 12, 13 and 14 (FIG. 1) are formed on the top of blocks 8 and 9. Hair lines 13 and 14 serve as a vernier scale. If, for example, the graduations on ruler 1 are spaced a distance of 0.010 of an inch and the spacing between lines 12 and 13, and 12 and 14 is 0.015 of an inch, lines 13 and 14 enable the user to estimate the position of a line on surface 2 into four parts between graduations on surface 3.

The use of two blocks of optical fibers is particularly advantageous because a hair line can then be formed that overlaps both surfaces 2 and 3. A single block could be employed, however, if this advantage is not to be utilized. In such case, the single block would extend from surface 2 to surface 3. One end of the optical fibers of the block would abut surface 2 as in the case of block 9. The other end of the optical fibers of the block would be co-planar with surface 3 so the light from surfaces 2 and 3 emanates from the resulting co-planar surface.

What is claimed is:

1. An optical system comprising: an elongated ruler having flat top and bottom surfaces; a slider adapted to move along the length of the ruler; a first mass of optical fibers supported by the slider, one end of the optical fibers lying on the top surface of the ruler and the other end of the optical fibers lying in a plane above the top surface of the ruler; and a second mass of optical fibers supported by the slider in abutment with the first mass, one end of the optical fibers of the second mass being co-planar with and spaced from the bottom surface of the ruler and the other end of the optical fibers of the second mass lying in the plane above the ruler.

2. The optical system of claim 1, in which a hair line is formed in the plane above the ruler that extends across the first and second masses.

3. The optical system of claim 1, in which the ruler has graduations on its top surface spaced 0.010 of an inch apart and three hair lines are formed in the plane above the ruler separated a distance of 0.015 of an inch apart, the hair lines extending across the first and second blocks in parallel relationship to the graduations.

4. The optical system of claim 1, in which the slider is adapted to fit around the ruler with one vertical side of the slider being spring loaded to bear on a vertical side of the ruler at two points.

5. An optical system for eliminating parallax comprising:
a first object having a first surface;
a second object having a graduated surface parallel to and offset laterally from the first surface;

a stepped mass of optical fibers defining two ends and an intermediate surface, one end being contiguous to the first surface, the intermediate surface being contiguous to the graduated surface and the other end forming a third surface parallel to and laterally offset from the first surface; and a slider supporting the mass of fibers and adapted to move along the perimeter of the second object.

6. The optical system of claim 5, in which the second object is a ruler.

7. The optical system of claim 5, in which a hair line is formed across said other end of the fibers.

References Cited

UNITED STATES PATENTS

| | | | |
|---|---|---|---|
| 2,011,945 | 8/1935 | Mathi | 350—243 |
| 2,520,758 | 8/1950 | Crownover | 350—115 |
| 2,736,097 | 2/1956 | Coleman | 350—243 |
| 3,187,627 | 6/1965 | Kapany | 350—96 |
| 3,304,784 | 2/1967 | Asher | 350—243 X |

FOREIGN PATENTS 1,296,696  5/1962  France.

OTHER REFERENCES

Lindberg: "IBM Technical Disclosure Bulletin," Fiber Optic Magnifier, vol. 9, No. 12, May 1967, pp. 1751–1752.

PAUL R. GILLIAM, Primary Examiner

U.S. Cl. X.R.

33—107; 116—135; 350—96, 116